No. 867,132. PATENTED SEPT. 24, 1907.
A. HEIMAN.
PIPE TONGS.
APPLICATION FILED FEB. 26, 1907.
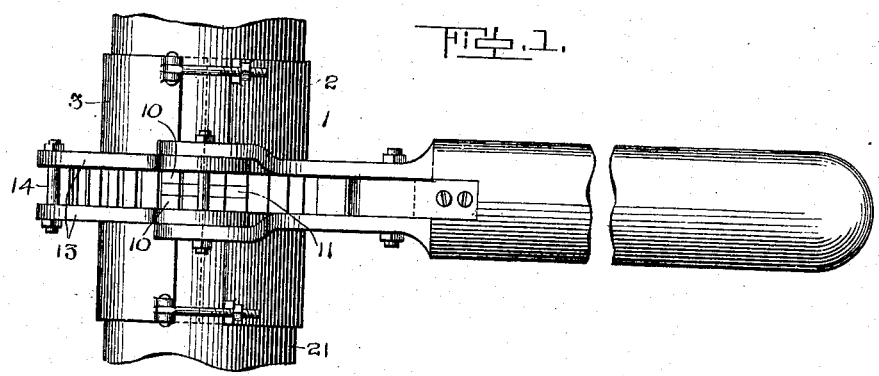
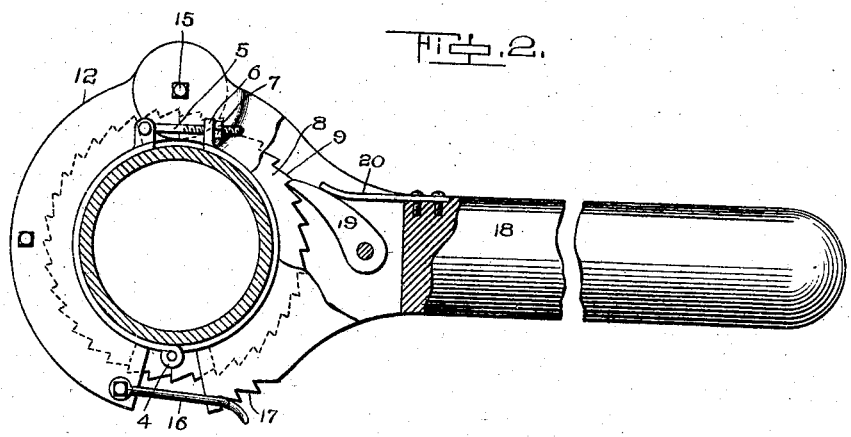
Inventor
August Heiman
By Victor J. Evans
Attorney
Witnesses

UNITED STATES PATENT OFFICE.

AUGUST HEIMAN, OF COALINGA, CALIFORNIA.

PIPE-TONGS.

No. 867,132.　　　Specification of Letters Patent.　　　Patented Sept. 24, 1907.

Application filed February 26, 1907. Serial No. 359,391.

*To all whom it may concern:*

Be it known that I, AUGUST HEIMAN, a citizen of the United States, residing at Coalinga, in the county of Fresno and State of California, have invented new and useful Improvements in Pipe-Tongs, of which the following is a specification.

The invention relates to an improvement in pipe tongs of that class designed to automatically grip and move the pipe when operating the tongs in one direction and to release the grip to permit independent movement of the tongs when the latter are moved in the opposite direction.

The main object of the present invention is the provision of a pipe tongs constructed to include an adjustable pipe enveloping member on which the tongs primarily operate, whereby to prevent the crushing or breaking of the pipe at the same time insuring a positive action of the tongs.

Figure 1 is a view in side elevation illustrating the application of my improved tongs, Fig. 2 is a plan of the same.

Referring particularly to the drawings my improved pipe tongs comprise a sleeve 1 made in two duplicate sections 2 and 3, connected at one edge by a hinge connection 4 and provided on the opposite edges with an adjustable securing means. This securing means preferably comprises bolts 5 connected adjacent the respective upper and lower edges of one hinge section and adapted to engage bifurcated ears 6 projecting from the adjacent edge of the remaining section. As the bolts 5 are threaded throughout their length, nuts 7 arranged to coöperate therewith beyond the ears 6 will serve to secure said sections in adjusted relation about a pipe or other cylindrical body. Each section is provided with an annular rib 8, extending circumferentially of the section and about midway the upper and lower edges thereof. The outer or free edge of each rib is formed with a series of teeth 9, forming in effect a ratchet bar extending circumferentially of the sleeve 1 to permit adjustment of the sleeve sections without interfering with the function of the ratchet bar and I project said rib sections 8 beyond those respective edges of the sleeve sections 2 and 3 which are provided with the adjustable securing means. The projected portion of one rib section is bifurcated to provide spaced arms 10, the projecting portion of the remaining rib being extended in the form of a single arm 11 to slidably fit between the arms 10. By this construction the ratchet member is arranged to completely encircle the sleeve member without regard to the adjustment of the sections of the latter.

The operating member of the tongs comprises a guiding band 12, including spaced plates 13 arranged to encircle the sleeve 1 above and below the ratchet member 8. The plates 13 are connected at determinate points by bolts 14 formed to maintain the plates in proper spaced relation. The guide member is formed in two sections, hinged at 15 for independent movement, the opposite ends of the sections being adjustably connected through the medium of a link bar 16 pivotally connected to one section with the cross bar arranged to engage any one of the series of teeth 17 formed on the peripheral edges of the adjacent portion of the other section. The guide member may be thus open to encircle the sleeve and secured in adjusted position thereabout in a simple and convenient manner. One of the sections of the guide member is provided with or secured to an operating handle 18, and between the plates 13 of said section is pivotally mounted a dog 19 adapted to coöperate with the teeth 9 on the ratchet member of the sleeve. A leaf spring 20 is arranged to overlie the dog and normally maintain the same in operative engagement with the teeth, as will be fully apparent from Fig. 2 of the drawings.

In use the sleeve sections are adjusted about a pipe section, as 21, being removably secured thereto through the adjusting devices described. The guide member is then arranged to encircle the sleeve above and below the ratchet member, and the handle reciprocated to cause the dog to engage and move the ratchet, and thereby the pipe section upon movement of the handle in one direction and to ride over the teeth 9 in the movement of the handle in the opposite direction.

The sleeve acts as a reinforcing jacket to avoid any possibility of crushing or breaking the pipe during the operation of the tongs, it being understood that the tongs act directly upon the sleeve through the ratchet member, and never directly grip the pipe.

The operation is exceedingly simple insuring a positive turning of the pipe in each operative movement of the handle, thereby screwing the pipe into the adjacent pipe sections with a minimum of labor.

Having thus described the invention what is claimed as new, is:—

1. A pipe tongs comprising a reinforcing sleeve, means for adjustably securing the sleeve about a pipe, a guide member arranged to encircle the sleeve, means for moving the guide member, and means for locking the guide member to the sleeve during movement in one direction.

2. A pipe tongs including an adjustable sleeve, a ratchet member carried thereby, a guide member adjustable about the sleeve, and means to lock the guide member to the ratchet member during movement of the guide member in one direction.

3. A pipe tongs including an adjustable sleeve, a ratchet member carried thereby, a guide member adjustable about the sleeve, and means to lock the guide member to the ratchet member during movement of the guide member in one direction, said means being arranged to free the guide member from the ratchet member during movement of the former in the opposite direction.

4. A pipe tongs including a sleeve member made in adjustable sections, a ratchet member connected with the sleeve member and extensible to provide an encircling ratchet member in all adjustments of the sleeve sections, a guide member loosely encircling the sleeve and adjustable with relation thereto, a handle carried by the guide member, and a dog carried by the handle and arranged to engage the ratchet teeth in movment of the handle in one direction.

5. A pipe tongs including a sleeve member made in adjustable sections, a ratchet member connected with the sleeve member and extensible to provide an encircling ratchet member in all adjustments of the sleeve sections, a guide member loosely encircling the sleeve and comprising spaced plates disposed above and below the ratchet member, a handle carried by the guide member, and a dog carried by the handle and arranged to engage the ratchet teeth in movement of the handle in one direction.

In testimony whereof, I affix my signature in presence of two witnesses.

AUGUST HEIMAN.

Witnesses:
J. L. GRESHAM,
CLYDE LITTLEJOHN.